United States Patent [19]

Horowitz et al.

[11] Patent Number: 4,966,872
[45] Date of Patent: Oct. 30, 1990

[54] BACTERIOSTATIC ACTIVATED CARBON FILTER

[75] Inventors: Carl Horowitz, Brooklyn; Mohan Sanduja, Flushing; Michael Dichter, deceased, late of Brooklyn, all of N.Y., by Anna Dichter and Wilhelm Dichter, heirs

[73] Assignee: Puro Corporation of America, Maspeth, N.Y.

[21] Appl. No.: 424,606

[22] Filed: Oct. 20, 1989

Related U.S. Application Data

[62] Division of Ser. No. 244,502, Sep. 14, 1988, Pat. No. 4,898,676.

[51] Int. Cl.$^5$ .................. B01J 37/36; B01J 20/26; A61K 31/79; A61K 31/78
[52] U.S. Cl. .................................. 502/7; 252/175; 424/80; 424/81; 502/402
[58] Field of Search .................... 502/7, 402; 252/175; 424/80, 81

[56] References Cited

U.S. PATENT DOCUMENTS

| | | | |
|---|---|---|---|
| 2,984,639 | 5/1961 | Stamberger et al. | 424/81 |
| 3,242,073 | 3/1966 | Guebert et al. | 210/501 |
| 3,325,402 | 6/1967 | Erskine | 210/764 |
| 3,431,208 | 3/1969 | Bailey | 424/80 |
| 3,703,583 | 11/1972 | Martin | 424/54 |
| 4,851,122 | 7/1989 | Stanley | 502/402 |

*Primary Examiner*—Paul E. Konopka
*Attorney, Agent, or Firm*—Steinberg & Raskin

[57] ABSTRACT

Polymerized salts of polymerizable anionic monomers with cationic germicides are chemically grafted onto activated carbon in a manner to form a permanent, covalent bond thereon. The grafting of such germicides onto the activated carbon imparts permanent bacteriostatic properties thereto and the resulting bacteriostatic activated carbon can be used for the purification of drinking water over prolonged periods of time. The passage of contaminated water across this activated carbon chemically grafted with the polymerized salt of the cationic germicide results in purification of the water which remains free of elevated bacteria counts often associated with "first flush" effluents. Mere absorption of such or any germicide into the pores of the activated carbon results in desorption and leaching out of the germicide into the effluent.

8 Claims, No Drawings

BACTERIOSTATIC ACTIVATED CARBON FILTER

This is a division of application Ser. No. 224,502, filed Sept. 14, 1988, now U.S. Pat. No. 4,898,676.

BACKGROUND OF THE INVENTION

Activated carbon is useful for the purification of drinking water by the removal by adsorption and absorption of undesired substances from the drinking water. However, activated carbon particles have a rough, porous texture which is capable of providing a favorable and protected environmental surface for bacterial growth (note "Pilot Plant Testing of Activated Carbon and Adsorption Systems" by Patrick R. Cairo, et al., Journal of American Water Works Association, November, 1979, Part 1, pages 660–673.) As a result, algae or bacteria colonize the carbon surface, thus diminishing the surface available to contact, the water.

Even if the water to be filtered is chlorinated, some bacteria are chlorine resistant and furthermore, when using activated carbon for the treatment of the water, it is found that the top layer of the activated carbon can actually remove the chlorine so effectively that bacteria grow in the lower layers thereof. Thus, the activated carbon actually can promote the growth of bacteria that would not grow in the chlorinated water per se. The most predominate bacteria that were isolated belonged to the genus Pseudomonas. In addition, bacteria of the genus Baccilus were also found in large quantity.

U.S. Pat. No. 3,325,402 of Arskine teaches the purification of water or other fluids by passing the same through a filter mass of granular activated carbon which has adsorbed thereon a water soluble antimicrobial quaternary ammonium salt. These salts are only physically contained within the pores of the activated carbon and quickly become leached out so that the antimicrobial effectiveness disappears after a short time. The leaching process itself results in elevated germicide levels of the effluent rendering it impure, and in fact often in violation of the Safe Drinking Water Act standards by virtue of the presence of the leached germicide.

The need therefore exists for a suitable means of purifying water and other liquids using an antimicrobial agent which remains effective over prolonged periods of time and long usage.

SUMMARY OF THE INVENTION

Generally speaking, the present invention mainly comprises activated carbon to which is chemically grafted and bonded a polymerized salt of a polymerizable anionic monomer with a cationic germicide. This grafted activated carbon is useful for the purification of water.

it is a primary object of the present invention to provide an activated carbon composition which is suitable for the purification of drinking water and which, in addition to the normal properties of activated carbon, also possesses permanent bacteriostatic properties which remain over prolonged usage.

It is another object of the present invention to provide for the purification of drinking water with such activated carbon composition.

It is yet a further object of the present invention to provide a method of producing an activated carbon composition of activated carbon having grafted thereto a polymerized salt of a polymerizable anionic monomer with a cationic germicide.

With the above and other objects in view, the present invention mainly comprises the production of an activated carbon composition wherein activated carbon has chemically grafted and bonded thereon a polymerized salt of a polymerizable anionic monomer with a cationic germicide.

The formation of such grafted composition is most conveniently effected by contacting activated carbon with a solution of a salt of a polymerizable anionic monomer with a cationic germicide in the presence of a polymerization catalyst and silver, ferrous or ferric ions. There may also be included in the solution an additional polymerizable water soluble monomer so that a copolymer is formed of the salt of the polymerizable anionic monomer.

The preferred anionic monomers are vinyl or acrylic monomers having sulfonic (—SO$_3$H) or carboxyl (—COOH) groups. It should be understood that the term "anionic monomers" actually refers to anionic polymeric materials, that is anionic polymerizable substances. These are generally monomers, but they may also be already partially polymerized. Nevertheless, from the standpoint of polymeric chemistry they can be considered as monomers because they commence further polymerization.

Among the suitable anionic monomers are those which form anionic polymers such as described in U.S. Pat. Nos. 2,984,639 and 3,325,402, as well as those disclosed in the article on "Polyelectrolytes" in volume 10 of the Encyclopedia of Polymer Sciences, pages 781 ff, and particularly at pages 781, 782 and 784.

As indicated above, the anionic monomers are preferably those which contain either a sulfonic or carboxyl group and are preferably those of the vinyl or acrylic type. Among these suitable monomers are ethyleneimine, hydroxyethyl methacrylate, dimethylaminoethyl methacrylate, ethylacrylate, butylacrylate, as well as carboxylated and sulfonated vinyls such as vinylchloride, vinylpyrrolidine, vinylidene chloride, vinylidene bromide, etc.

Cationic germicidal materials are well known in the art. See, for instance the section on "Quaternary Ammonium and Related Compounds" in the article on "Antiseptics and Disinfectants" in Kirk-Othmer Encyclopedia of Chemical Technology 2nd edition (vol. 2 p. 632–635), incorporated herein by reference. Among the most common of these are germicidal quaternary ammonium compounds such as benzethonium chloride. Others of this class (and generic formulas and description thereof) are those mentioned, for instance, in U.S. Pat. Nos. 2,984,639, 3,325,402, 3,703,583, and 3,431,208 and British Patent No. 1,319,396. Usually one of the substituents on the quaternary nitrogen has a chain length of about 8 to 18 carbon atoms. Other types are the omidines such as the substituted guanidines e.g. chlorhexidine and the corresponding compound having 2-ethylhexyl groups instead of chlorophenyl groups (Sterwin 904) and other bisbiguanides such as those described in German patent application No. P2,332,382 published Jan. 10, 1974 which sets forth the following formula:

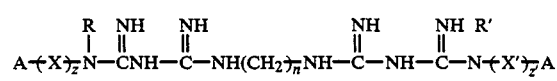

in which A and A' signify as the case may be either (1) a phenyl radical, which as substituent can contain up to 2 alkyl or alkoxy groups with 1 up to about 4 C-atoms, a nitro group or a halogen atom, (2) an alkyl group which contains 1 to about 12 C-atoms, or (3) alicyclic groups with 4 to about 12 C-atoms, X and X' as the case may be represent an alkylene radical with 1–3 C-atoms, z and z' are as the case may be either zero or 1, R and R' as the case may be represent either hydrogen an alkyl radical with 1 to about 12 C-atoms or an aralkyl radical with 7 to about 12 C-atoms, n is a whole number of 2 to inclusively 12 and the polymethylene chain $(CH_2)_n$ can be interrupted by up to 6 ether, thioether, phenyl-or naphthyl groups, or the pharmaceutically suitable salts thereof. The germicidal compound is preferably one which has a germicidal activity such that its phenol coefficient is well over 50, more preferably well above 100, such as above about 200 or more for *S. aureus;* for instance the phenol coefficient (A.O.A.C.) of benzethonium chloride (Hyamine 1622) is given by the manufacturer as 410, for *S. aureus.*

The cationic germicides that can be used in accordance with the present invention are those which will form salts with anionic monomers so that the resulting salt can be polymerized and grafted onto activated carbon. Of course, the cationic germicide should be nontoxic and should not cause any health hazard during its time of use in grafted form on the activated carbon, for example as a filter for drinking water. The same considerations go into the selection of the anionic monomers, as well as the catalysts used in effecting the polymerization reaction.

As indicated, the method of grafting the salt of the cationic germicide and anionic monomer comprises contacting activated carbon with an aqueous solution of such salt in the presence of a catalyst and silver, ferrous or ferric ions. Catalysts for effecting such reaction include hydrogen peroxide, urea peroxide, ammonium persulfate, tert-butylhydroperoxide, ditertbutyl peroxide, benzoyl peroxide, dicumyl peroxide, lauroyl peroxide, tert-butyl perbenzoate and peracetic acid. The most preferred, taking all matters into consideration for the purposes of the present invention, are hydrogen peroxide, urea peroxide and ammonium persulfate.

It is the graft initiator such as the silver ion, as used in U.S. Pat. No. 3,698,931, or ferrous and ferric ions that effect the graft or permanently chemically attach the copolymer onto the surface of the activated carbon. The reaction according to the present invention is believed to take place as follows:

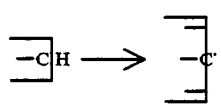

1.

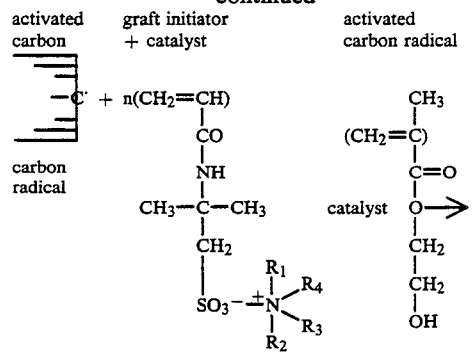

2.

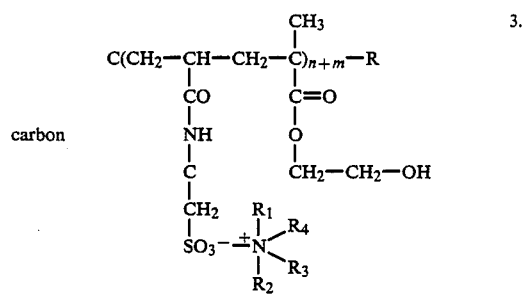

3.

If the molecular amount of the comonomers is in the same (n=m) the structure is as shown above. Generally, however, the ionic monomer is used in an amount of no more than about 10–20 mol percent. As a result, the actual molecule grafted onto the activated carbon may include more than one group of the second monomer. The cationic bacteriacide is preferably used in an approximately 1:1 mol ratio with respect to the anionic monomer.

DESCRIPTION OF PREFERRED EMBODIMENTS

The following examples are given to further illustrate the invention. The scope of the invention is not, however meant to be limited to the specific details of the examples.

EXAMPLE I 20 gms of 2-acrylamido-2-methyl propane sulfonic acid (AMPS) in a one liter beaker there was added 80 gms of hydroxy ethyl methacrylate (HEMA). To the resulting mixture was added 400 gms of water and the mixture stirred with a magnetic stirrer for 5 minutes. 2.0 gms of ammonium persulfate was added to the beaker along with 10 gms of germicide Barquat 425 OZ. The mixture was stirred again until formation of a complete solution. The pH of the solution was adjusted to about 7.0 with dilute ammonium hydroxide solution and 200 gms of activated charcoal was added. The contents were mixed at room temperature for about 10 minutes. 0.4 gms of ferrous ammonium sulfate was then added and the mixture warmed to 80° C. for 30 minutes while stirring continuously. The activated charcoal treated solution was subjected to filtration and the thus obtained grafted charcoal was dried in an oven at 120°–150° F., cooled and washed with 400–500 ml of water. The charcoal was dried at 120°–150° F. and again washed with same amount of water. The drying and washing was tested for leaching with bromophenol blue and the test was found to be negative. (See leach test table 2 below) The composition of the formulation discussed above is given below:

| Activated Charcoal | 200 gms |
|---|---|
| AMPS | 20 gms |
| HEMA | 80 gms |
| Water | 400 gms |
| Ammonium Persulfate | 2.0 gms |
| Germicide Barquat 425 OZ | 10 gms |
| Ferrous Ammonium Sulfate | 0.4 gms |

Adjustment of pH to 7.0 with ammonium hydroxide solution:

The germicide Barquat 425 OZ is obtained from Lonza Inc., Fairlawn, N.J. and has the following composition:

| n-Alkyl ($C_{14}$. 60%, $C_{16}$. 30%, $C_{12}$. 5%, $C_{18}$. 5%) Dimethyl Benzyl Ammonium Chlorides | 25% |
|---|---|
| n-Alkyl ($C_{12}$. 68%, $C_{14}$. 32%) Dimethyl Ethylbenzyl Ammonium Chlorides | 25% |
| Water | 50% |

EXAMPLE 2

2(a) 2 gms of 2 acrylamido-2-methyl propane sulfonic acid and 3 gms of biocide zinc omadine was introduced into a 200 ml. beaker and 100 ml. water was added thereto. The mixture was stirred to a fine suspension with a magnetic stirrer for 10–15 minutes at room temperature.

2(b) 60 ml of the above prepared solution of 2(a) was introduced into a 400 ml beaker which contained 200 ml of water. 5 gms of hydroxyethyl methacrylate was added, the mixture was stirred for 2–4 minutes and the pH of the solution adjusted to 6–7 with ammonium hydroxide solution. 0.2 gms of the ammonium persulfate, 0.002 gms of silver nitrate and 20 gms of the activated charcoal were added to the contents of the beaker and warmed to 90° C. for 20 minutes with continuous stirring. The charcoal was filtered and then dried in an oven maintained at 200° F. The dried charcoal was washed with 200 ml of water and dried again. The process of drying and subsequent washing with water was repeated 5 times. The filtrate from each was subjected to leach test and found to be negative. (See leach test below) The biocide zinc omadine is a 48% aqueous dispersion of zinc-2-pyridinethiol 1-oxide containing 52% of inert ingredients. This was obtained from Olin Chemicals, Stamford, Conn.

EXAMPLE 3

3(a): 100 ml of water was added to 2 gms of acrylamido-2-methyl propane sulfonic acid (AMPS) and 1.5 gms of biocide sodium omadine in a 200 ml beaker. The mixture was stirred to a fine suspension with a magnetic stirrer for 10–15 minutes at room temperature.

3(b): 25 ml. of solution 3(a) was introduced into a 600 ml. beaker containing 300 ml. of water, and 4 gms of hydroxy ethyl methacrylate was added. The mixture was stirred for 2–4 minutes and the pH adjusted to 6–7 with ammonium hydroxide solution. 0.75 gms of ammonium-persulfate, 0.002 gms of silver nitrate and 25 gms of activated charcoal was added, and the contents warmed to 90° C. for 20 minutes with continuous stirring. The charcoal was filtered and then dried in an oven at 200° F. The treated charcoal was washed and dried again 5 successive times. The filtrate from each wash was checked for leaching and the test was found to be negative. (See leach test).

The biocide sodium omadine is 40% aqueous solution, obtained from Olin Chemicals, Stamford, Conn.

EXAMPLE 4

2 gms of acrylamido-2-methyl propane-sulfonic acid and 8 gms. of hydroxyethyl methacrylate were put in a 600 ml. beaker. 600 ml. of water, 0.1 gms. of ammonium persulfate, 0.04 gms. of ferrous ammonium sulfate and 20 gms. of activated charcoal were added. The contents was stirred and the pH adjusted to 6–7 with ammonium hydroxide solution. To the pH adjusted charcoal containing mixture, was added 60 ml. of 3.5% solution of germicide cetyl pyridinium chloride obtained from Hexagon. The resulting contents of the containers was warmed to 80° C. for 20 minutes with continuous stirring, filtered and the charcoal dried in an oven at 200° F. The drying was followed by washing 5 times. The filtrate from each wash was tested for leaching with bromophenol blue—a test which was found to be negative each time (See leach test table 2).

EXAMPLE 5

To 8 gms. of 25% solution of sodium vinyl sulfonate in a 400 ml. beaker was added 8 gms. of hydroxy ethyl methacrylate and 100 ml. of water. The mixture was thoroughly stirred with a magnetic stirrer for 5 minutes, and 0.2 gms. of ammonium persulfate and 0.04 gms. of ferrous ammonium sulfate were added. The pH of the solution was adjusted to 6–7 with dilute ammonium hydroxide solution and 20 gms. of activated charcoal was added followed by the addition of 50 ml. of 2% solution of cetyl pyridinium chloride. The contents of the beaker was warmed to 90° C. for 25 minutes with continuous stirring, filtered and the charcoal dried for 1 hour at 250° F. The drying of the charcoal followed by washing was carried out 5 times. The filtrate from each wash was tested for leaching and the test was found to be negative.

EXAMPLE 6

Bionol Ro-50 was used as germicide in this formulation for antibacterial activity. 2 gms. of acrylic acid and 8 gms. of hydroxy ethyl methacrylate were introduced into a 600 ml. container and 100 ml. of deionized water added. The mixture was thoroughly stirred with a magnetic stirrer for 5 minutes and 0.2 gms. of ammonium pursulfate and 0.04 gms. of ferrous ammonium sulfate were added. The mixture was again stirred and the pH of the solution adjusted to 6–7 with dilute ammonium hydroxide solution. 20 gms. of activated charcoal was added to the contents of the beaker followed by the addition of 3 gms. of Bionol Ro-50. The contents were warmed to 90° C. for 20 minutes while stirring continuously, filtered and the charcoal dried at 250° F. The dried charcoal was washed 5 times in the same way as in the other examples and tested for leaching in the washings.

I. TEST FOR ANTIBACTERIAL ACTIVITY OF TREATED ACTIVATED CHARCOAL SAMPLES

The principle of the method is based on the ability of the germicide complex on the surface of the charcoal to inhibit in in vitro the growth of bacteria on and/or around the charcoal particles. Therefore, the antibacterial properties of the treated activated charcoal samples prepared from the formulations of Examples 1 to 6, were tested against the organisms like *Staphylococcus Aureus* and *Pseudomonas Aeruginosa*, according to the procedure given below: Approximately 6-8 ml. of Agar-Agar Culture was introduced into two petri-dishes. 2-4 gms. of treated activated charcoal sample was carefully introduced at the centre of the petri-dish and the sides of the petri-dishes were seeded with strains of *Staphylococcus Aureus*. The 2nd petri-dish was loaded with 2-4 gms. of untreated charcoal sample for control, other experimental conditions were the same as in first petri-dish.

Likewise in another set of two petri-dishes the same experiment was repeated as in the petri-dishes of first set except that seeding was with *Pseudomonas Aeruginosa*. The Petri-dishes were incubated at 37° C. for a number of weeks and the inhibition of bacterial growth was observed weekly along with the control. The results are summarized in Table I.

3. LEACH TEST WITH BOILING WATER

A small amount (5 gms) of treated activated charcoal obtained from formulations of Examples 1 and 4-6, was boiled with deionized water for 10-15 minutes and allowed to filter. The filtrate was tested with 0.05% bromphenol blue solution. No blue color developed. This indicates that even treatment of activated charcoal with boiling water could not leach out the quat complex grafted on the surface of the charcoal particles. A similar experiment was repeated with treated activated charcoal obtained from formulations in Examples 2 and 3 and the wash was subjected to UV Spectra analysis. No absorption was indicted at 239, 268, 320 nm for zinc omadine complex and at 243, 281 and 332 for sodium omadine complex.

4. TEST OF ZINC OMADINE AND SODIUM OMADINE COMPLEX IN THE WASHINGS OF THE TREATED ACTIVATED CHARCOAL

TABLE 1

| | ANTIBACTERIAL ACTIVITY OF GERMICIDES | | | | | | | | | | | | |
|---|---|---|---|---|---|---|---|---|---|---|---|---|---|
| | | BACTERIAL GROWTH INHIBITED DURING 12 WEEKS | | | | | | | | | | | |
| EXAMPLE 1 | GERMICIDE | 1 | 2 | 3 | 4 | 5 | 6 | 7 | 8 | 9 | 10 | 11 | 12 WEEKS |
| 1. | Barquat 4250-Z | + | + | + | + | + | + | + | + | + | + | + | + |
| 2. | Zinc Omadine | + | + | + | + | + | + | + | + | + | + | + | + |
| 3. | Sodium Omadine | + | + | + | + | + | + | + | + | + | + | + | + |
| 4. | Cetyl Pyridinium Chloride | + | + | + | + | + | + | + | + | + | + | + | + |
| 5. | Cetyl Pyridinium Chloride | + | + | + | + | + | + | + | + | + | + | + | + |
| 6. | Bionol R050 | + | + | + | + | + | + | + | + | + | + | + | + |

The results in Table I positively indicates that the germicides used in Examples 1-6 are effective in inhibiting the growth of bacteria on or around the treated charcoal samples over prolonged periods of time. It should be noted that the activated charcoal in each case was diluted to 1:10 ratio with untreated charcoal and the diluted charcoal was tested again for antibacterial activity following the same procedure as above. There was no bacterial growth on or around the surface of the diluted charcoal particles. The results in Table I apply to both types of organisms—*Staphylococcus Aureus* and *Pseudomonas Aeruginosa*.

2. BROMOPHENOL BLUE TEST

As mentioned in Examples 1, 4, 5, 6, the treated charcoal samples were washed 5 times. In order to test the absence of quals (quaternary salts) in the washings of treated charcoal samples, a test with 0.5% solution of bromphenol blue was carried out with the washings. Bromphenol blue reacts with the quats to form an insoluble blue colored complex. A drop or two of bromphenol blue was added to the washings and the results obtained are given in Table II.

TABLE II

| BROMOPHENOL BLUE TEST | |
|---|---|
| EXAMPLE QUAT | Addition of few drops of 0.05% solution of bromophenol blue into the washings |
| 1 Barquat 4250-Z | ++ |
| 4,5 Cetyl Pyridinium Chloride | ++ |
| 6 Bionol RO-50 | ++ |
| | ++ sign means that there was no blue color formation, hence the absence of quat complex in the washings of the treated charcoal sample |

In order to test the absence of zinc omadine and sodium omadine complex in the washings of the treated charcoal, ultraviolet spectra of the washed solution was taken at 239, 268 and 320 nm for zinc omadine complex and at 243, 281 and 332 nm for sodium omadine complex. The spectra thus obtained did not indicate any absorption either due to zinc omadine complex or sodium omadine complex in the respective washings. This indicates that the complex is not being leached out in the successive washing.

5. TOXICITY TEST ON EXTRACTS OBTAINED BY WASHING TREATED ACTIVATED CHARCOAL SAMPLE

The treated activated charcoal samples prepared from Example 1 were sent to Materials Science Toxicology Laboratories, Memphis, Tenn., for washing with distilled water and testing of the extracts for toxicity evaluation. Their findings are summarized below:

The charcoal sample sent was labelled as Y-7454. The charcoal was washed with 500 ml. of distilled water. This extract labelled as Y-7454A was included in the tissue culture agar overlay test. The charcoal was washed again with 500 ml. of distilled deionized water and tested as before, the extract being labelled as Y-7454B. After one week, the same sample of charcoal was washed with two 500 ml. volumes of distilled water as previously reported and the extracts tested again in the tissue culture. The extracts were labelled Y-7454C and Y-7454D respectively.

TISSUE CULTURE AGAR OVERLAY TEST RESULTS

Y-7454A: NONCYTOTOXIC (1/0)
Y-7454B: NONCYTOTOXIC (1/0)

Y-7454C: NONCYTOTOXIC (1/0)
Y-7454D: NONCYTOTOXIC (1/0)

Note: Values of (0/0) and/or (1/0) are recorded as Noncytotoxic: Values above are Cytotoxic Negative Control: Noncytotoxic (0/0)
Positive Control: Cytotoxic (3/4)

Remarks: The charcoal sample, as such, contained a biologically active leachable constituent. The extracts, however, were found to be noncytotoxic.

Although the invention has been illustrated with respect to the grafting onto activated carbon of specific salts of anionic monomers and cationic bacteriacides, it is apparent that variations and modifications thereof can be made. Such variations and modifications are intended to be comprehended within the scope of the present invention.

We claim:

1. Bacteriostatic activated carbon, said activated carbon having chemically grafted and covalently bonded thereto in a germicidal effective amount a polymerized salt of a polymerizable anionic monomer and a cationic germicide, said chemically grafted salt remaining permanently bound to said activated carbon without leaching or desorbing therefrom upon passage of water across the same.

2. Bacteriastatic activated carbon of claim 1 and wherein said salt of said polymerizable anionic monomer and said cationic germicide is copolymerized with a polymerizable monomer copolymerizable therewith.

3. Activated carbon according to claim 2 wherein the amount of said polymerizable anionic monomer of said salt is 10–20 mol percent of the amount of said other polymerizable monomer.

4. Activated carbon according to claim 1 and wherein said polymerizable anionic monomer and said cationic germicide of said salt are present in a 1:1 mol ratio.

5. The method which comprises contacting activated carbon with an aqueous solution of a salt of a polymerizable anionic monomer and a cationic germicide in the germicidal effective amount in the presence of a polymerization catalyst and a graft initiator, whereby said salt is polymerized and chemically grafted onto said activated carbon to be chemically bonded thereto, said chemically grafted salt remaining permanently bound to said activated carbon without leaching of desorbing therefrom upon passage of water across the same.

6. Method according to claim 5 wherein said graft initiator is silver, ferrous or ferric ions.

7. Method according to claim 6 wherein said catalyst is hydrogen peroxide, urea peroxide or ammonium persulfate.

8. Method according to claim 5 wherein said aqueous solution contains another polymerizable monomer which is copolymerizabe with said anionic monomer.

* * * * *